US012756766B2

(12) United States Patent
Jagdfeld et al.

(10) Patent No.: US 12,756,766 B2
(45) Date of Patent: Oct. 6, 2026

(54) LOCATION-BASED MOBILE DEVICE MANAGEMENT OF MANAGED DEVICES BASED ON WIRELESS INTERACTIONS

(71) Applicant: JAMF Software, LLC, Minneapolis, MN (US)

(72) Inventors: Joshua Jagdfeld, Minneapolis, MN (US); Jonathan William Yuresko, Doylestown, PA (US); Leslie N. Helou, Pendleton, IN (US); Matthew Vlasach, Larkspur, CA (US)

(73) Assignee: JAMF Software, LLC, Minneapolis, MN (US)

( * ) Notice: Subject to any disclaimer, the term of this patent is extended or adjusted under 35 U.S.C. 154(b) by 166 days.

(21) Appl. No.: 18/473,004

(22) Filed: Sep. 22, 2023

(65) Prior Publication Data

US 2024/0106913 A1 Mar. 28, 2024

Related U.S. Application Data

(60) Provisional application No. 63/376,910, filed on Sep. 23, 2022.

(51) Int. Cl.

*G06F 15/16* (2006.01)
*H04L 67/00* (2022.01)
*H04L 67/55* (2022.01)

(52) U.S. Cl.

CPC .............. *H04L 67/55* (2022.05); *H04L 67/34* (2013.01)

(58) Field of Classification Search

CPC ................................ H04L 67/34; H04L 67/55
See application file for complete search history.

(56) References Cited

U.S. PATENT DOCUMENTS

2003/0101254 A1* 5/2003 Sato .................... H04L 41/0893 709/224
2010/0235487 A1* 9/2010 Guthery .............. H04L 41/0213 709/230

(Continued)

OTHER PUBLICATIONS

International Search Report and Written Opinion dated Feb. 21, 2024 for PCT Application No. PCTUS2023/74970, 16 pages.

(Continued)

*Primary Examiner* — Imad Hussain
(74) *Attorney, Agent, or Firm* — Benesch Friedlander Coplan & Aronoff LLP

(57) ABSTRACT

In certain aspects, a computer-implemented method includes receiving, responsive to a managed device communicating with a reader, user data and access information of the managed device. The method includes identifying device information of the managed device associated with the user data and the access information. The method also includes determining at least one mobile device action to perform on the managed device based on the device information, the user data, and the access information. The method includes, responsive to determining the at least one mobile device action, transmitting a message to a push notification service, wherein the message initiates the managed device to communicate with a mobile device management server. The method includes, responsive to the managed device communicating with the mobile device management server, transmitting a management command to the managed device to perform the at least one mobile device action. Systems and media are also provided.

7 Claims, 5 Drawing Sheets

(56) References Cited

U.S. PATENT DOCUMENTS

| | | | | |
|---|---|---|---|---|
| 2014/0113593 | A1* | 4/2014 | Zhou | H04W 12/069 455/411 |
| 2014/0297859 | A1* | 10/2014 | Qureshi | H04W 12/37 709/225 |
| 2015/0304484 | A1* | 10/2015 | Halmstad | H04W 48/02 455/419 |
| 2017/0054571 | A1* | 2/2017 | Kitchen | G06F 3/0488 |
| 2018/0336359 | A1 | 11/2018 | Lakhani et al. | |
| 2019/0239065 | A1* | 8/2019 | Amundsen | H04W 8/22 |
| 2020/0100108 | A1 | 3/2020 | Everson et al. | |
| 2020/0314651 | A1 | 10/2020 | Pirch et al. | |
| 2020/0358765 | A1* | 11/2020 | Olsen | H04L 63/0428 |
| 2021/0144140 | A1* | 5/2021 | Murphy | H04L 9/321 |
| 2024/0070256 | A1* | 2/2024 | Maxim | G06F 21/44 |

OTHER PUBLICATIONS

International Searching Authority dated Feb. 21, 2024 for PCT/US2023/74970, 16 pages.

* cited by examiner

200

LOCATION-BASED MOBILE DEVICE MANAGEMENT OF MANAGED DEVICES BASED ON WIRELESS INTERACTIONS

CROSS-REFERENCE TO RELATED APPLICATIONS

The present application claims the benefit of priority under 35 U.S.C. § 119 from U.S. Provisional Patent Application Ser. No. 63/376,910 entitled "LOCATION-BASED MOBILE DEVICE MANAGEMENT OF MANAGED DEVICES BASED ON WIRELESS INTERACTIONS," filed on Sep. 23, 2022, the disclosure of which is hereby incorporated by reference in its entirety for all purposes.

TECHNICAL FIELD

The present disclosure generally relates to mobile devices and management systems, and more specifically relates to location-based mobile device management of managed devices based on wireless interactions.

BACKGROUND

Organizations typically require configurations and mandatory settings on end user devices in order to make sure these organizationally managed devices and the data thereon are kept secure. Often times, it is standard to generally configure these security settings in a set-and-forget manner once the devices come under the organization's management. Similarly, but in a less preferable manner, sometimes the end user or employee of the organization has to manually configure their devices to a specific security specification. Moreover, some organizations have specialized levels of security for particular rooms or regions within their buildings, which require the managed devices to be configured or reconfigured with even more strict security settings.

In some conventional examples, however, an employee may gain entry into a secured room or region of the building with a physical badge (e.g., white plastic card) that has access credentials to allow entry while also carrying his end user device that may unknowingly have a security threat thereon or that requires elevated security settings. In such an example, the secured room or region of the building may be compromised due to the inability to prevent the employee from badging in at that moment or the inability to manage actions or security settings on the end user device even if the security threat on the end user device was detected just prior to badging in.

The description provided in the background section should not be assumed to be prior art merely because it is mentioned in or associated with the background section. The background section may include information that describes one or more aspects of the subject technology.

SUMMARY

In certain aspects, the present disclosure provides systems and methods that allow for location-based mobile device management of managed devices based on wireless interactions, such as, but not limited to near-field communication (NFC), Bluetooth, and other appropriate wireless communications, with a hardware wireless reader. For example, the disclosed systems and methods integrate mobile credentials of managed devices with an organization's management and security lifecycle. By utilizing credential presentation of a managed end user device at a hardware wireless reader located near secured entrances, specific security settings, end user device experience, and access control actions can be controlled based on the context/location of where the managed end user device interacted with (e.g., badged in to) the hardware wireless reader. In certain aspects, when it is determined that the mobile access credential of the managed device is in an unsatisfactory security state immediate management of configurations and/or settings of the managed device can be deployed to restrict access to secured regions of a building or restrict access to sensitive networks, to name a few examples. Additionally, in certain aspects, upon badging in to the hardware wireless reader, the organization's mobile device management server can automatically issue or provision the managed device for specific actions based on the location of the hardware wireless reader such as, but not limited to, installing device drivers, locating assistance, accessing potentially sensitive networks, configuring WiFi profiles, restricting cellular data usage, specifying a virtual private network (VPN), identifying lunch locations, and other appropriate actions. While some of these actions are described in the mobile device management (MDM) context, it should be understood that in other aspects, upon badging in, non-MDM actions can also be performed on some network configurations using data policy and/or private access such as, but not limited to, restricting specific websites, creating data caps, encrypting traffic through private access technology for specific services or apps, and other appropriate network actions.

According to certain aspects of the present disclosure, a computer-implemented method is provided. The computer-implemented method includes receiving, responsive to a managed device communicating with a reader, user data and access information of the managed device. The computer-implemented method includes identifying device information of the managed device associated with the user data and the access information. The computer-implemented method includes determining at least one mobile device action to perform on the managed device based on the device information, the user data, and the access information. The computer-implemented method includes responsive to determining the at least one mobile device action, transmitting a message to a push notification service, wherein the message initiates the managed device to communicate with a mobile device management server. The computer-implemented method includes responsive to the managed device communicating with the mobile device management server, transmitting a management command to the managed device to perform the at least one mobile device action.

According to certain aspects of the present disclosure, a system is provided. The system includes a memory comprising instructions and a processor configured to execute the instructions which, when executed, cause the processor to receive, responsive to a managed device communicating with a reader, user data and access information of the managed device. The processor is configured to execute the instructions which, when executed, cause the processor to identify device information of the managed device associated with the user data and the access information. The processor is configured to execute the instructions which, when executed, cause the processor to determine at least one mobile device action to perform on the managed device based on the device information, the user data, and the access information. The processor is configured to execute the instructions which, when executed, cause the processor to, responsive to determining the at least one mobile device action, transmitting a message to a push notification service, wherein the message initiates the managed device to communicate with a mobile device management server. The processor is configured to execute the instructions which, when executed, cause the processor to, responsive to the managed device communicating with the mobile device management server, transmitting a management command to the managed device to perform the at least one mobile device action.

According to certain aspects of the present disclosure a non-transitory machine-readable storage medium comprising machine-readable instructions for causing a processor to execute a method is provided. The method includes receiving, responsive to a managed device communicating with a reader, user data and access information of the managed device. The method includes identifying device information of the managed device associated with the user data and the access information. The method includes determining at least one mobile device action to perform on the managed device based on the device information, the user data, and the access information. The method includes responsive to determining the at least one mobile device action, transmitting a message to a push notification service, wherein the message initiates the managed device to communicate with a mobile device management server. The method includes responsive to the managed device communicating with the mobile device management server, transmitting a management command to the managed device to perform the at least one mobile device action.

According to certain aspects of the present disclosure, a computer-implemented method is provided. The computer-implemented method includes receiving, responsive to a managed device communicating with a reader, user data and access information of the managed device. The computer-implemented method includes identifying device information of the managed device associated with the user data and the access information. The computer-implemented method includes determining a risk level of the managed device based on the device information, the user data, and the access information. The computer-implemented method includes, responsive to determining the risk level is below a predetermined threshold, transmitting a risk command to an access management server to revoke access of the managed device.

According to certain aspects of the present disclosure, a system is provided. The system includes a memory comprising instructions and a processor configured to execute the instructions which, when executed, cause the processor to receive, responsive to a managed device communicating with a reader, user data and access information of the managed device. The processor is configured to execute the instructions which, when executed, cause the processor to identify device information of the managed device associated with the user data and the access information. The processor is configured to execute the instructions which, when executed, cause the processor to determine a risk level of the managed device based on the device information, the user data, and the access information. The processor is configured to execute the instructions which, when executed, cause the processor to, responsive to determining the risk level is below a predetermined threshold, transmitting a risk command to an access management server to revoke access of the managed device.

According to certain aspects of the present disclosure a non-transitory machine-readable storage medium comprising machine-readable instructions for causing a processor to execute a method is provided. The method includes receiving, responsive to a managed device communicating with a reader, user data and access information of the managed device. The method includes identifying device information of the managed device associated with the user data and the access information. The method includes determining a risk level of the managed device based on the device information, the user data, and the access information. The method includes, responsive to determining the risk level is below a predetermined threshold, transmitting a risk command to an access management server to revoke access of the managed device.

According to certain aspects of the present disclosure, a computer-implemented method is provided. The computer-implemented method includes receiving, responsive to a managed device communicating with a reader, user data and access information of the managed device. The computer-implemented method includes identifying device information of the managed device associated with the user data and the access information. The computer-implemented method includes determining at least one mobile device action to perform on the managed device based on the device information, the user data, and the access information. The computer-implemented method includes, responsive to determining the at least one mobile device action, enabling an endpoint management service to perform the at least one mobile device action on the managed device.

According to certain aspects of the present disclosure, a system is provided. The system includes a memory comprising instructions and a processor configured to execute the instructions which, when executed, cause the processor to receive, responsive to a managed device communicating with a reader, user data and access information of the managed device. The processor is configured to execute the instructions which, when executed, cause the processor to identify device information of the managed device associated with the user data and the access information. The processor is configured to execute the instructions which, when executed, cause the processor to determine at least one mobile device action to perform on the managed device based on the device information, the user data, and the access information. The processor is configured to execute the instructions which, when executed, cause the processor to, responsive to determining the at least one mobile device action, enable an endpoint management service to perform the at least one mobile device action on the managed device.

According to certain aspects of the present disclosure a non-transitory machine-readable storage medium comprising machine-readable instructions for causing a processor to execute a method is provided. The method includes receiving, responsive to a managed device communicating with a reader, user data and access information of the managed device. The method includes identifying device information of the managed device associated with the user data and the access information. The method includes determining at least one mobile device action to perform on the managed device based on the device information, the user data, and the access information. The method includes, responsive to determining the at least one mobile device action, enabling an endpoint management service to perform the at least one mobile device action on the managed device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to healthcare, retail, educational, or corporate settings, these are examples only and are not to be considered limiting. The teachings of the present disclosure may be applied to any mobile device environments, including but not limited to home environments, healthcare environments, retail environments, educational environments, corporate environments, and other appropriate environments. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed system addresses a technical problem tied to computer technology and arising in the realm of mobile device management, namely the technical problem of preventing an employee from badging into a secured entrance or not being able to manage actions or security settings on the end user device even if the security threat on the end user device was detected just prior to badging in. The disclosed system solves this technical problem by providing location-based mobile device management of managed devices based on wireless interactions with a hardware wireless reader.

Figure 1:
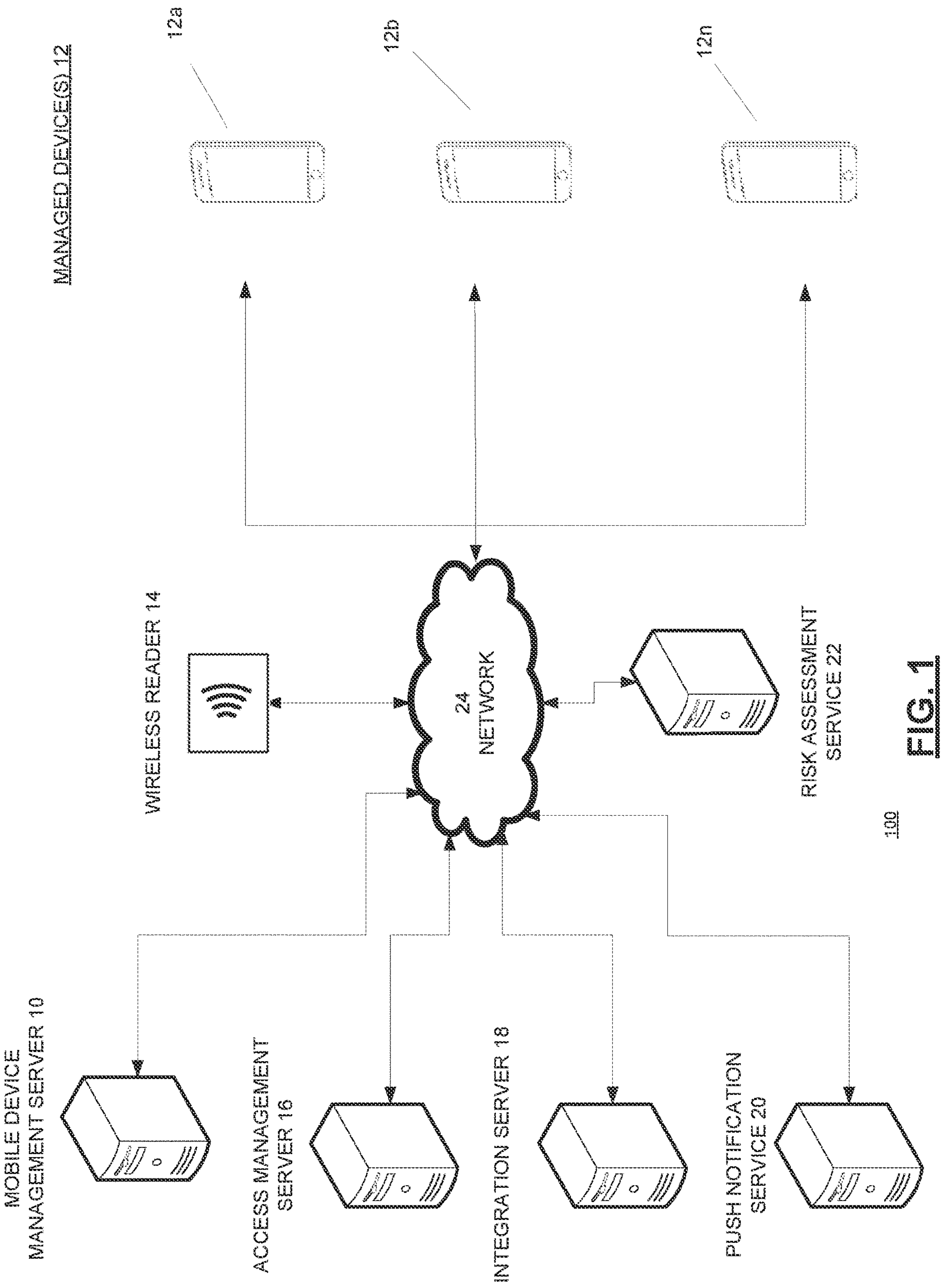
FIG. 1 illustrates an example architecture for location-based mobile device management of managed devices based on wireless interactions.

FIG. 1 illustrates an example architecture 100 for location-based mobile device management of managed devices based on wireless interactions such as, but not limited to, near-field communication (NFC) interactions, Bluetooth interactions, and other appropriate interactions. For example, the architecture 100 includes a mobile device management server 10, at least one managed device 12, such as a first managed device 12*a* and a second managed device 12*b* to an nth managed device 12*n*, an wireless reader 14, an access management server 16, an integration server 18, a push notification service 20, and a risk assessment service 22 all connected over a network 24. In certain aspects, the mobile device management server 10 may be connected to the push notification service 20 over a separate network.

The mobile device management server 10 can be any device having an appropriate processor, memory, and communications capability for communicating with the at least one managed device 12, the integration server 18, and the push notification service 20. For purposes of load balancing, the mobile device management server 10 may include multiple servers. The access management server 16 can be any device having an appropriate processor, memory, and communications capability for communicating with the wireless reader 14, the integration server 18, and the risk assessment service 22. The integration server 18 can be any device having an appropriate processor, memory, and communications capability for communicating with the mobile device management server 10, the access management server 16, and the risk assessment service 22. The push notification service 20 can be any device having an appropriate processor, memory, and communications capability for communicating with the mobile device management server 10 and the at least one managed device 12. The risk assessment service 22 can be any device having an appropriate processor, memory, and communications capability for communicating with the access management server 16 and the integration server 18. While the mobile device management server 10 and the integration server 18 are illustrated as separate servers, it should be understood that in certain aspects the integration server 18 can be hosted on the mobile device management server 10 or can be integrated with the risk assessment service 22.

The at least one managed device 12, such as the first managed device 12*a* and the second managed device 12*b*, to which the mobile device management server 10 communicates with over the network 24 via the push notification service 20, can be, for example, a mobile phone, a tablet computer, a mobile computer, a laptop computer, a portable media player, an electronic book (eBook) reader, or any other device having appropriate processor, memory, and communications capabilities. The wireless reader 14 can be any device having an appropriate processor, memory, wireless communications capability with the at least one managed device 12, and other communications capability for communication with the access management server 16. In certain aspects, the wireless reader 14 is a near-field communications (NFC) reader that includes at least a NFC read mode. In other aspects, the wireless reader 14 is a Bluetooth reader. In certain aspects, the mobile device management server 10, the access management server 16, the integration server 18, the push notification service 20, and the risk assessment service 22 can be a cloud computing server of an infrastructure-as-a-service (IaaS) and be able to support a platform-as-a-service (PaaS) and software-as-a-service (SaaS) services.

It should be noted that the at least one managed device 12, as illustrated in FIG. 1 as the first managed device 12*a* and the second managed device 12*b* to the nth managed device 12*n*, of the present disclosure is not limited to any particular configuration or number of devices. In certain aspects, a different number of managed devices may be present.

The network 24 can include, for example, any one or more of a personal area network (PAN), a local area network (LAN), a campus area network (CAN), a metropolitan area network (MAN), a wide area network (WAN), a broadband network (BBN), the Internet, and the like. Further, the network 24 can include, but is not limited to, any one or more of the following network topologies, including a bus network, a star network, a ring network, a mesh network, a star-bus network, tree or hierarchical network, and the like.

Figure 2:
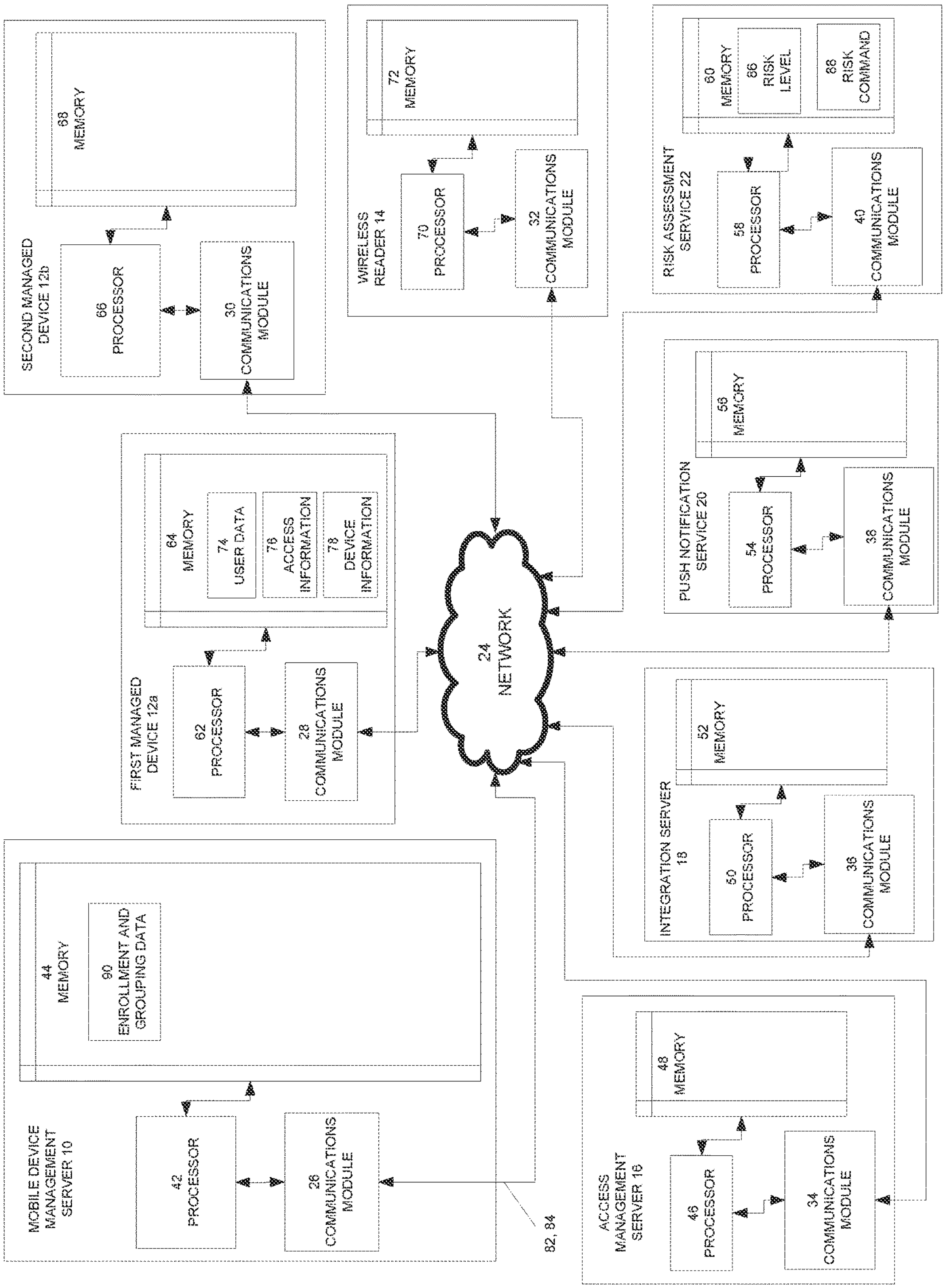
FIG. 2 is a block diagram illustrating the example managed device(s), mobile device management server, wireless reader, access management server, integration server, push notification service, and risk assessment service from the architecture of FIG. 1 according to certain aspects of the disclosure.

FIG. 2 is a block diagram illustrating examples of the mobile device management server 10, the at least one managed device 12, such as the first managed device 12*a* and the second managed device 12*b*, the wireless reader 14, the access management server 16, the integration server 18, the push notification service 20, and the risk assessment service 22 in the architecture of FIG. 1 according to certain aspects of the disclosure. It should be understood that for purposes of explanation the first managed device 12*a* and the second managed device 12*b* are described, but any number of the at least one managed device 12 could be used.

The mobile device management server 10, the at least one managed device 12, such as the first managed device 12*a* and the second managed device 12*b*, the wireless reader 14, the access management server 16, the integration server 18, the push notification service 20, and the risk assessment service 22 are connected over the network 24 via respective communication modules 26, 28, 30, 32, 34, 36, 38, 40. The communication modules 26, 28, 30, 32, 34, 36, 38, 40 are configured to interface with the network 24 to send and receive information, such as data, requests, responses, and commands to other devices on the network 24. The communications modules 26, 28, 30, 32, 34, 36, 38, 40 can be, for example, modems or Ethernet cards.

The mobile device management server 10 includes a processor 42, the communications module 26, and a memory 44. The processor 42 of the mobile device management server 10 is configured to execute instructions, such as instructions physically coded into the processor 42, instructions received from software in the memory 44, or a combination of both. In certain aspects, the processor 42 of the mobile device management server 10 is configured to receive, responsive to the first managed device 12*a* communicating with the wireless reader 14, user data 74 and access information 76 of the first managed device 12*a*. In certain aspects, the processor 42 of the mobile device management server 10 is configured to identify device information 78 of the first managed device 12*a* associated with the user data 74 and the access information 76. In certain aspects, the processor 42 of the mobile device management server 10 is configured to determine at least one mobile device action 80 to perform on the first managed device 12*a* based on the device information 78, the user data 74, and the access information 76. The at least one mobile device action 80 can be any appropriate action such as, but not limited to, installing device drivers, locating assistance, accessing potentially sensitive networks, configuring WiFi profiles, restricting cellular data usage, specifying a virtual private network (VPN), changing device configurations, restricting access to secured regions, identifying lunch locations, managing network configurations using data policy and/or private access, restricting specific websites, creating data caps, encrypting traffic through private access technology for specific services or apps, and other appropriate actions.

In certain aspects, the processor 42 of the mobile device management server 10 is configured to, responsive to determining the at least one mobile device action 80, transmit a message 82 to the push notification service 20, wherein the message 82 initiates the first managed device 12*a* to communicate with the mobile device management server 10. In certain aspects, the processor 42 of the mobile device management server 10 is configured to, responsive to the first managed device 12*a* communicating with the mobile device management server 10, transmit a management command 84 to the first managed device 12*a* to perform the at least one mobile device action 80 such as, but not limited to, installing device drivers, locating assistance, accessing potentially sensitive networks, configuring WiFi profiles, restricting cellular data usage, specifying a virtual private network (VPN), changing device configurations, restricting access to secured regions, turning off device camera, identifying lunch locations, and other appropriate actions. In certain other aspects, the processor 42 of the mobile device management server 10 is configured to, responsive to determining the at least one mobile device action 80, enable an endpoint management service, such as but not limited to Unified Endpoint Management (UEM), to perform the at least one mobile device action 80, such as, but not limited to, managing network configurations using data policy and/or private access, restricting specific websites, creating data caps, encrypting traffic through private access technology for specific services or apps, and other appropriate network actions.

The access management server 16 includes a processor 46, the communications module 34, and a memory 48. The processor 46 of the access management server 16 is configured to execute instructions, such as instructions physically coded into the processor 46, instructions received from software in the memory 48, or a combination of both.

The integration server 18 includes a processor 50, the communications module 36, and a memory 52. The processor 50 of the integration server 18 is configured to execute instructions, such as instructions physically coded into the processor 50, instructions received from software in the memory 52, or a combination of both. In certain aspects, the processor 50 of the integration server 18 is configured to receive, responsive to the first managed device 12*a* communicating with the wireless reader 14, user data 74 and access information 76 of the first managed device 12*a*. In certain aspects, the processor 50 of the integration server 18 is configured to transmit the user data 74, the access information 76, and the device information 78 to the mobile device management server 10.

The push notification service 20 includes a processor 54, the communications module 38, and a memory 56. The processor 54 of the push notification service 20 is configured to execute instructions, such as instructions physically coded into the processor 54, instructions received from software in the memory 56, or a combination of both.

The risk assessment service 22 includes a processor 58, the communications module 40, and a memory 60. The processor 46 of the risk assessment service 22 is configured to execute instructions, such as instructions physically coded into the processor 58, instructions received from software in the memory 60, or a combination of both. In certain aspects, the processor 46 of the risk assessment service 22 is configured to receive, responsive to the first managed device 12*a* communicating with the wireless reader 14, user data 74 and access information 76 of the first managed device 12*a*. In certain aspects, the processor 46 of the risk assessment service 22 is configured to identify device information 78 of the first managed device 12*a* associated with the user data 74 and the access information 76. In certain aspects, the processor 46 of the risk assessment service 22 is configured to determine a risk level of the managed device based on the device information, the user data, and the access information The first manage device 12*a* includes a processor 62, the communications module 28, and a memory 64. The processor 62 of the first managed device 12*a* is configured to execute instructions, such as instructions physically coded into the processor 62, instructions received from software in the memory 64, or a combination of both.

The second managed device 12*b* includes a processor 66, the communications module 30, and a memory 68. The processor 66 of the second managed device 12*b* is configured to execute instructions, such as instructions physically coded into the processor 66, instructions received from software in the memory 68, or a combination of both.

The wireless reader 14 includes a processor 70, the communications module 32, and a memory 72. The processor 70 of the wireless reader 14 is configured to execute instructions, such as instructions physically coded into the processor 70, instructions received from software in the memory 72, or a combination of both. The wireless reader 14 can be disposed near a secured entrance, such as, but not limited to, a building, a room in a building, and other appropriate entrances. The wireless reader 14 is configured to control locking mechanisms of the secured entrance.

The mobile device management server 10 may correspond to hardware and/or software that implement mobile device management functions (e.g., Device Management framework). For example, in corporate, healthcare, and educational contexts, to name a few, the mobile device management server 10 can enroll, monitor, and manage managed devices, such as the first managed device 12*a* and the second managed device 12*b*, and utilize their mobile access credentials to modify configurations, perform actions, add restrictions, remove restrictions, and revoke access credentials on the managed devices based on location data. In certain aspects, the mobile device management server 10 may store (or access) enrollment and grouping data 90. The enrollment and grouping data 90 may include enrollee data identifying all mobile devices that are managed by the mobile device management server 10, such as data associated with the first managed device 12*a*, and the second managed device 12*b* to the nth managed device 12*n*.

While some actions are described above in the mobile device management (MDM) context, it should be understood that in other aspects, upon badging in to the wireless reader 14, non-MDM actions can also be performed on some network configurations using data policy and/or private access such as, but not limited to, restricting specific websites, creating data caps, encrypting traffic through private access technology for specific services or apps, and other appropriate network actions.

It should be noted that although various embodiments may be described herein with reference to corporate, healthcare, and educational settings, this is for example only and not to be considered limiting. The teachings of the present disclosure may be applied in any mobile device environments, including but not limited to home environments, corporate environments, educational environments, healthcare environments, retail environments, government environments, organization environments, and other appropriate environments.

Figure 3:
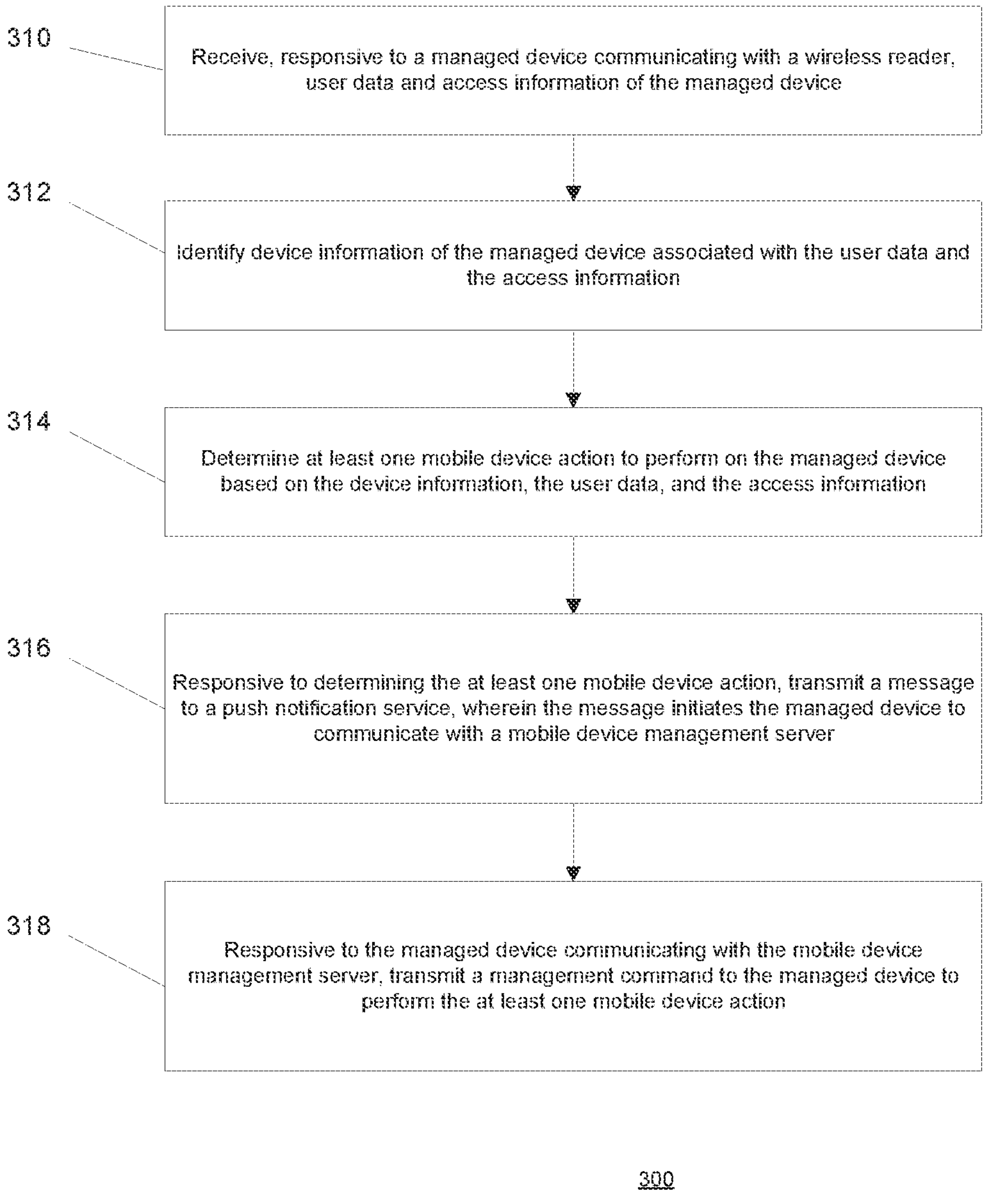
FIG. 3 illustrates an example process of location-based mobile device management of managed devices based on wireless interactions with reference to the example first managed device, second managed device, mobile device management server, carrier server, and push notification service of FIG. 2.

FIG. 3 illustrates an example process 300, which can use the mobile device management server 10, the at least one managed device 12, such as the first managed device 12*a* and the second managed device 12*b*, the wireless reader 14, the access management server 16, the integration server 18, the push notification service 20, and the risk assessment service 22 of FIG. 2. While FIG. 3 is described with reference to FIG. 2, it should be understood that the process steps of FIG. 3 may be performed by other systems.

The process 300 begins by proceeding to step 310 when the processor 42 of the mobile device management server 10 or the processor 50 of the integration server 18 receives, responsive to the first managed device 12*a* communicating with the wireless reader 14, user data 74 and access information 76 of the first managed device 12*a*. As depicted at step 312, the processor 42 of the mobile device management server 10 identifies device information 78 of the first managed device 12*a* that is associated with the user data 74 and the access information 76.

As depicted at step 314, the processor 30 of the mobile device management server 10 determines at least one mobile device action 80 to perform on the first managed device 12*a* based on the device information 78, the user data 74, and the access information 76. At step 318, responsive to determining the at least one mobile device action 80, the processor 30 of the mobile device management server 10 transmits a message 82 to the push notification service 20. The message 82 initiates the first managed device 12*a* to communicate with the mobile device management server 10. As depicted at step 318, responsive to the first managed device 12*a* communicating with the mobile device management server 10, the processor 30 of the mobile device management server 10 transmits a management command 84 to the first managed device 12*a* to perform the at least one mobile device action 80 such as, but not limited to, installing device drivers, locating assistance, accessing potentially sensitive networks, configuring WiFi profiles, restricting cellular data usage, specifying a virtual private network (VPN), identifying lunch locations, and other appropriate actions.

Figure 4:
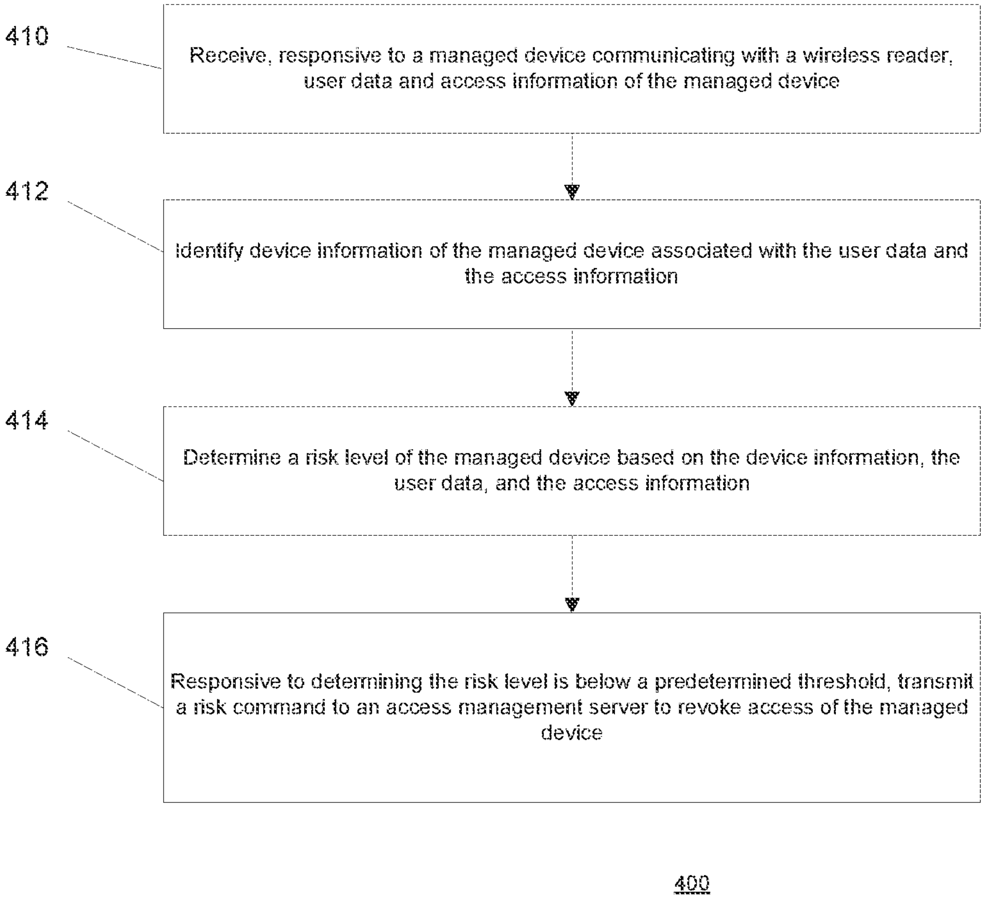
FIG. 4 illustrates another example process of mobile device management of personally owned, managed devices with reference to the example first managed device, second managed device, mobile device management server, carrier server, and push notification service of FIG. 2.

FIG. 4 illustrates an example process 400, which can use the mobile device management server 10, the at least one managed device 12, such as the first managed device 12*a* and the second managed device 12*b*, the wireless reader 14, the access management server 16, the integration server 18, the push notification service 20, and the risk assessment service 22 of FIG. 2. While FIG. 4 is described with reference to FIG. 2, it should be understood that the process steps of FIG. 4 may be performed by other systems.

The process 400 begins by proceeding to step 410 when the processor 58 of the risk assessment service 22 receives, responsive to the first managed device 12*a* communicating with the wireless reader 14, user data 74 and access information 76 of the first managed device 12*a*. As depicted at step 412, the processor 58 of the risk assessment service 22 identifies device information 78 of the first managed device 12*a* that is associated with the user data 74 and the access information 76.

As depicted at step 414, the processor 58 of the risk assessment service 22 determines a risk level 86 of the first managed device 12*a* based on the device information 78, the user data 74, and the access information 76. At step 418, responsive to determining the risk level 86 is below a predetermined threshold, the processor 58 of the risk assessment service 22 transmits a risk command 88 to an access management server 16 to revoke access of the first managed device 12*a*.

Examples will now be described with reference to the example process 300 of FIG. 3 and the example process 400 of FIG. 4.

As an example, an end user associated with the first managed device 12*a* attempts to gain access to a secured entrance by placing the first managed device 12*a* in close proximity to the wireless reader 14, which is located near the secured entrance. The secured entrance may be the entrance to a room in a research and development (R & D) facility, which requires cameras to be turned off on mobile devices. As such, when communication is initiated between the first managed device 12*a* and the wireless reader 14 the user data 74 on the first managed device 12*a* is transmitted to wireless reader 14, which is transmitted to the access management server 16. The access management server 16 identifies the access information 76 associated with the user data 74, and transmits both the user data 74 and the access information 76 to integration server 18, or in some aspects, to the mobile device management server 10 which hosts functions of the integration server 18. The integration server 18 or the mobile device management server 10 identifies the device information 78 associated with user data 74 and the access information 76. The mobile device management server 10 then determines that the camera of the first managed device 12*a* is required to be turned off when entering this room of the R & D facility based on user data 74, the access information 76, and the device information 78. Responsive to this determination, the mobile device management server 10 proceeds to transmit the message 82 to the push notification service 20, which initiates the first managed device 12*a* to communicate with the mobile device management server 10. Once in communication with each other, the mobile device management server 10 transmits the management command 84 to the first managed device 12*a* to turn off its camera.

In another example with reference to the second managed device 12*b*, an end user associated with the second managed device 12*b* similarly attempts to gain access to a secured entrance (e.g., room) of the R & D facility. In a similar manner, when communication is initiated between the second managed device 12*b* and the wireless reader 14 the user data 74 on the second managed device 12*b* is transmitted to wireless reader 14, which is transmitted to the risk assessment service 22. The risk assessment service 22 identifies the access information 76 associated with the user data 74, and transmits both the user data 74 and the access information 76 to the integration server 18. The integration server 18 or the risk assessment service 22 identifies the device information 78 associated with user data 74 and the access information 76. Here, the risk assessment service 22 will determine the risk level 86 of the second managed device 12*b* based on the device information 78, the user data 74, and the access information 76. If the risk assessment service 22 determines that the risk level 86 is below a predetermined threshold, then the risk assessment service 22 will transmit the risk command 88 to the access management server 16 to revoke access to the second managed device 12*b* such that the end user associated with the second managed device 12*b* will be prevented from entering the secured room (e.g., the secured entrance will remain locked). In other examples, a digital access credential on the second managed device could be suspended, revoked, or denied provisioning by the access management server 16.

Although certain embodiments and workflows are described herein with reference to performing mobile device management for a managed device, it should be understood that mobile device management may also be performed for multiple devices, such as the first managed device 12*a* and the second managed device 12*b* to the nth managed device 12*n*. In certain aspects, for example, the mobile device management server 10 can be configured to select multiple managed devices or a group of managed devices. The management message, such as the message 82, may identify multiple managed devices or a group of managed devices, and the push notification service 20 may send push notifications to each managed device.

It should be understood that in some aspects the example processes of FIGS. 3 and 4 can be performed in parallel or simultaneously.

Figure 5:
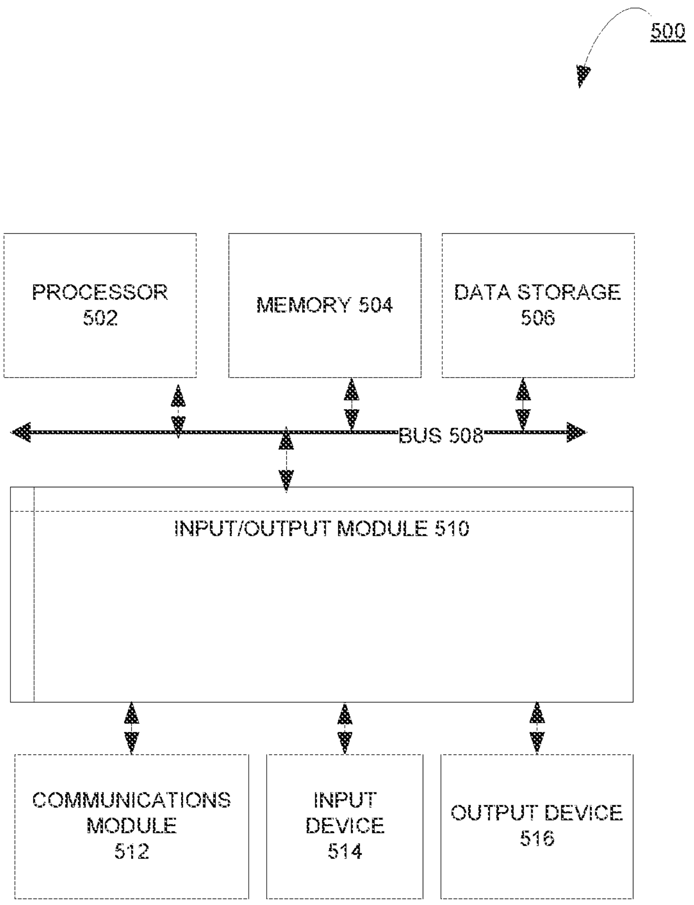
FIG. 5 is block diagram illustrating an example computer system with which the mobile device management server, first managed device, second managed device, wireless reader, access management server, integration server, push notification service, and risk assessment service of FIG. 2 can be implemented.

FIG. 5 is a block diagram illustrating an example computer system 500 with which the mobile device management server 10, the at least one managed device 12, such as the first managed device 12*a* and the second managed device 12*b*, the wireless reader 14, the access management server 16, the integration server 18, the push notification service 20, and the risk assessment service 22 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the mobile device management server 10, the at least one managed device 12, such as the first managed device 12*a* and the second managed device 12*b*, the wireless reader 14, the access management server 16, the integration server 18, the push notification service 20, and the risk assessment service 22) includes a bus 508 or other communication mechanism for communicating information, and a processor 502 (e.g., the processor 42, 46, 50, 54, 58, 62, 66, 70) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 44, 48, 52, 56, 60, 64, 68, 72), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 26, 28, 30, 32, 34, 36, 38, 40) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the mobile device management server 10, the at least one managed device 12, such as the first managed device **12*a* and the second managed device 12*b*, the wireless reader 14, the access management server 16, the integration server 18, the push notification service 20, and the risk assessment service 22 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512** (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:

receiving, responsive to a managed device communicating with a reader, user data and access information of the managed device;

identifying device information corresponding to configuration settings, hardware details, or device type of the managed device associated with the user data and the access information;

determining at least one mobile device action based on the device information, the user data, and the access information, the at least one mobile device action configured to cause the managed device to perform an action that restricts a functionality of the managed device;

responsive to determining the at least one mobile device action, transmitting a message to a push notification service, wherein the message initiates the managed device to communicate with a mobile device management server;

responsive to determining the at least one mobile device action, enabling an endpoint management service to perform a network action of the at least one mobile device action; and responsive to the managed device communicating with the mobile device management server, transmitting a management command to the managed device to perform the at least one mobile device action.

2. The computer-implemented method of claim 1, wherein receiving the user data and access information of the managed device is received at the mobile device management server.

3. The computer-implemented method of claim 2, wherein the mobile device management server hosts functions of an integration server.

4. The computer-implemented method of claim 1, wherein receiving the user data and access information of the managed device is received at an integration server.

5. The computer-implemented method of claim 1, wherein the at least one mobile device action is configured to cause the managed device to install device drivers, locate assistance, access potentially sensitive networks, configure WiFi profiles, restrict cellular data usage, specify a virtual private network (VPN), change device configurations, restrict access to secured regions, turn off device camera, or identify lunch locations.

6. The computer-implemented method of claim 1, wherein the managed device communicates with the reader wirelessly.

7. The computer-implemented method of claim 5, wherein the managed device communicates with the reader via one of near-field communication and Bluetooth.

* * * * *